United States Patent
Goeschel et al.

(10) Patent No.: US 10,781,284 B2
(45) Date of Patent: *Sep. 22, 2020

(54) POLYURETHANE-POLYISOCYANURATE COMPOUND COMPRISING OUTSTANDING MECHANICAL PROPERTIES

(71) Applicant: BASF SE, Ludwigshafen am Rhein (DE)

(72) Inventors: Julia Goeschel, Bremen (DE); Stefan Bokern, Shanghai (CN); Ragnar Stoll, Osnabrueck (DE)

(73) Assignee: BASF SE, Ludwigshafen am Rhein (DE)

( * ) Notice: Subject to any disclaimer, the term of this patent is extended or adjusted under 35 U.S.C. 154(b) by 135 days.

This patent is subject to a terminal disclaimer.

(21) Appl. No.: 15/576,135

(22) PCT Filed: May 18, 2016

(86) PCT No.: PCT/EP2016/061060
§ 371 (c)(1),
(2) Date: Nov. 21, 2017

(87) PCT Pub. No.: WO2016/188805
PCT Pub. Date: Dec. 1, 2016

(65) Prior Publication Data
US 2018/0148536 A1 May 31, 2018

(30) Foreign Application Priority Data

May 28, 2015 (EP) ..................................... 15169705

(51) Int. Cl.
| | | |
|---|---|---|
| C08G 18/66 | (2006.01) |
| C08G 18/58 | (2006.01) |
| C08G 18/32 | (2006.01) |
| C08G 18/40 | (2006.01) |
| C08G 18/48 | (2006.01) |
| C08G 18/22 | (2006.01) |
| C08G 18/10 | (2006.01) |
| C08G 18/76 | (2006.01) |

(52) U.S. Cl.
CPC ......... *C08G 18/6674* (2013.01); *C08G 18/10* (2013.01); *C08G 18/225* (2013.01); *C08G 18/3206* (2013.01); *C08G 18/4045* (2013.01); *C08G 18/4804* (2013.01); *C08G 18/485* (2013.01); *C08G 18/4829* (2013.01); *C08G 18/4841* (2013.01); *C08G 18/58* (2013.01); *C08G 18/7671* (2013.01); *C08G 2105/02* (2013.01)

(58) Field of Classification Search
CPC .. C08G 18/6674; C08G 18/10; C08G 18/225; C08G 18/3206; C08G 18/4045; C08G 18/58; C08G 18/4841; C08G 18/4829; C08G 18/4804
See application file for complete search history.

(56) References Cited

U.S. PATENT DOCUMENTS

| | | | |
|---|---|---|---|
| 3,883,571 A | 5/1975 | Allport et al. | |
| 4,229,347 A | 10/1980 | Holt et al. | |
| 5,326,833 A * | 7/1994 | Parodi .................. | C08G 18/003 525/528 |
| 2013/0303694 A1* | 11/2013 | Debien .................. | C08L 63/00 524/728 |
| 2014/0371406 A1* | 12/2014 | Esbelin .............. | C08G 18/6685 525/528 |
| 2016/0137814 A1 | 5/2016 | Otero Martinez et al. | |
| 2017/0260320 A1 | 9/2017 | Bokern et al. | |
| 2017/0267806 A1 | 9/2017 | Goeschel et al. | |

FOREIGN PATENT DOCUMENTS

| | | |
|---|---|---|
| EP | 2257580 A2 | 12/2010 |
| WO | 0210250 A1 | 2/2002 |
| WO | 2010121898 A1 | 10/2010 |
| WO | 2011107367 A1 | 9/2011 |
| WO | 2012103965 A1 | 8/2012 |
| WO | 2013057070 A1 | 4/2013 |
| WO | 2013098034 A1 | 7/2013 |
| WO | 2013143841 A1 | 10/2013 |
| WO | 2015063062 A1 | 5/2015 |
| WO | 2015144435 A1 | 10/2015 |
| WO | 2016102246 A1 | 6/2016 |
| WO | 2016156133 A1 | 10/2016 |
| WO | 2016188774 A1 | 12/2016 |
| WO | 2016193020 A1 | 12/2016 |

OTHER PUBLICATIONS

International Search Report and Written Opinion for International Application No. PCT/EP2016/061060, dated Aug. 5, 2016, 11 pages (German).
Extended European SEarch Report for EP Patent Application No. 15169705.9, dated Nov. 4, 2015, 6 pages (German).
International Search Report for International Application No. PCT/EP2016/061060, dated Aug. 5, 2016, 2 pages.

* cited by examiner

*Primary Examiner* — John E Uselding
(74) *Attorney, Agent, or Firm* — Armstrong Teasdale LLP

(57) ABSTRACT

Polyurethane-polyisocyanurate compounds and processes for preparing polyurethane-polyisocyanurate compounds are disclosed herein. A process includes mixing component (a) polyisocyanate with component (b) a mixture obtainable by introducing an alkali metal or alkaline earth metal salt into a compound R—NH—CO—R containing urethane groups, where R is not hydrogen and is not COR, component (c) compounds containing one or more epoxide groups, component (d) one or more compounds having at least two isocyanate-reactive groups, comprising compounds having NH2 and/or primary OH groups, and component (e) optionally fillers and other additives, to form a reaction mixture, and reacting the reaction mixture to form the polyurethane-polyisocyanurate compound, wherein the molar amount of alkali metal and/or alkaline earth metal ions in the reaction mixture per mole of urethane group in component (b) is 0.0001 to 3.5 and the isocyanate index is greater than 150. Use of polyurethane-polyisocyanate compounds for producing vehicle parts is also disclosed.

15 Claims, No Drawings

POLYURETHANE-POLYISOCYANURATE COMPOUND COMPRISING OUTSTANDING MECHANICAL PROPERTIES

CROSS-REFERENCE TO RELATED APPLICATIONS

This application is a U.S. National Phase Application of PCT/EP2016/061060, filed May 18, 2016, which claims the benefit of priority to EP Application No. 15169705.9, filed May 28, 2015, the contents of which are hereby expressly incorporated by reference in their entirety.

The present invention relates to a process for preparing polyurethane-polyisocyanurate compounds by mixing polyisocyanate (a) with a mixture obtainable by introducing an alkali metal or alkaline earth metal salt into a compound R—NH—CO—R' containing urethane groups, where R is not hydrogen and is not COR" (b), compounds (c) containing one or more epoxide groups, and one or more compounds having at least two isocyanate-reactive groups, comprising compounds having primary amine and/or primary alcohol groups, (d), and optionally fillers and other additives (e), to form a reaction mixture, and reacting said mixture to form the polyurethane-polyisocyanurate compound, wherein the molar amount of alkali metal and/or alkaline earth metal ions in the reaction mixture per mole of urethane group in the compound (b) is 0.0001 to 3.5 and the isocyanate index is greater than 150. The present invention further relates to a process for preparing such polyurethane-polyisocyanate compounds and also to the use thereof for producing vehicle parts.

Particularly for the production of plastics parts of large surface area, examples being fibre composites, a plastic system is required which has a long open time. Thus, for example, reinforcing agents, such as fibres or fibre mats made from glass or carbon, can be fully wetted, and the plastics system completely fill the mould, before the plastics system is cured to give the completed plastic. Another requirement, however, is that the plastics systems should cure very rapidly to give the plastic, thus enabling faster demoulding times and so increasing the profitability. Large-surface-area fibre composites of this kind are employed, for example, in automotive or aircraft construction or in the production of wind turbine rotor blades. An additional requirement, particularly with regard to components used as bodywork parts in vehicle construction, is that of high mechanical resistance and, in particular, impact toughness. The desire here in particular is for good mechanical properties with products having high glass transition temperatures, in order to ensure very largely constant mechanical properties over a wide temperature range. Generally speaking, the long open time required is achieved only by epoxy systems or unsaturated polyester systems, which, however, generally take a long time to cure.

Common production methods for such plastics parts of large surface area are, for example, hand lamination, injection moulding, the resin injection process, also referred to as resin transfer moulding or RTM, or vacuum-assisted infusion processes, an example being the vacuum assisted resin transfer moulding (VARTM) process, or prepreg technology. Particularly preferred are vacuum-assisted infusion processes, since they allow the production of large components rapidly and in high quality.

One option for extending the open time in conjunction with rapid curing of polyurethane systems is to use acid-blocked catalysts. Thus EP 2257580 describes the use of acid-blocked amine catalysts in polyurethane systems for producing sandwich components. When demoulding times are acceptably short, however, acid-blocked catalysts only allow the working time to be prolonged by a figure in the region of minutes. What is required, in contrast, is a working time of up to several hours.

WO 2013057070 describes the production of fibre-reinforced polyisocyanurate components, using as catalyst a latent reactive trimerization catalyst. Disadvantages of these components are an open time at room temperature which is still decidedly short, and also high brittleness.

WO 10121898 describes a polyisocyanate component which consists in parts of a urea prepolymer (—NH—CO—NH—) which is bidentate in respect of the anion, this prepolymer having been mixed with lithium chloride. When this component is mixed with a second component containing epoxide and polyol, and the resulting mixture is heated to 80-90° C., a rapid reaction occurs, leading to through-curing of the material.

WO 12103965 describes an epoxy-based system which is based on the same catalysis as described in WO 10121898. In this case, the groups needed for catalysis are defined, via the two hydrogen atoms located on the nitrogen, as a carboxamide group (—CO—NH$_2$), bidentate in respect of the anion, with LiCl.

WO 13098034 embraces a reactive mixture which as well as lithium halide requires a —(—CO—NH—CO—)— group which is bidentate in respect of the cation. The urea component described in this specification may also contain polydentate biuret groups (—NH—CO—NH—CO—NH—).

Described in WO 13143841 is a trimerization catalyst consisting of alkali metal or alkaline earth metal salts in combination with carboxamide groups of the structure —CO—NH2, which are bidentate in respect of the anion, or in combination with groups —(—CO—NH—CO—)—, which are bidentate in respect of the cation.

A disadvantage of the systems described in WO 10121898, WO 12103965, WO 13098034 and WO 13143841 is that the urea, carboxylate or biuret-blocked catalyst must be added in relatively large amounts in order to have sufficient activity. The materials obtained are relatively brittle.

An object of the present invention, therefore, was to supply a plastics system, more particularly a reactive system for the production of an isocyanate polyaddition compound, which at the production stage exhibits a long open time at room temperature, and which at elevated temperature is able to cure within a few minutes. The catalysis here ought to be highly effective, particularly in comparison to WO 10121898, WO 12103965, WO 13098034 and WO 13143841.

The object of the invention is achieved by a process for preparing polyurethane-polyisocyanurate compounds by mixing polyisocyanate (a) with a mixture obtainable by introducing an alkali metal or alkaline earth metal salt into a compound R—NH—CO—R' containing urethane groups, where R is not hydrogen and is not COR" (b), compounds (c) containing one or more epoxide groups, and one or more compounds having at least two isocyanate-reactive groups, comprising compounds having NH$_2$ and/or primary OH groups, (d), and optionally fillers and other additives (e), to form a reaction mixture, and reacting said mixture to form the polyurethane-polyisocyanurate compound, wherein the molar amount of alkali metal and/or alkaline earth metal ions in the reaction mixture per mole of urethane group in the compound (b) is 0.0001 to 3.5 and the isocyanate index is greater than 150. Subject matter of the present invention further is a polyurethane-polyisocyanate compound obtainable by such a process, and also the use thereof for producing vehicle parts or in producing rotor blades for wind turbines.

Polyisocyanates (a), also referred to below as first isocyanate (a), encompass all aliphatic, cycloaliphatic and aromatic isocyanates that are known for the preparation of polyurethanes. They preferably have an average functionality of less than 2.5. Examples are 2,2'-, 2,4'- and 4,4'-diphenylmethane diisocyanate, the mixtures of monomeric diphenylmethane diisocyanates and higher polycyclic homologues of diphenylmethane diisocyanate (polymeric MDI), isophorone diisocyanate (IPDI) or oligomers thereof, 2,4- or 2,6-tolylene diisocyanate (TDI) or mixtures thereof, tetramethylene diisocyanate or its oligomers, hexamethylene diisocyanate (HDI) or its oligomers, naphthylene diisocyanate (NDI), or mixtures thereof.

Preferred for use as polyisocyanates (a) is monomeric diphenylmethane diisocyanate, for example 2,2'-diphenylmethane diisocyanate, 2,4'-diphenylmethane diisocyanate, 4,4'-diphenylmethane diisocyanate or mixtures thereof. Diphenylmethane diisocyanate here may also be used as a mixture with its derivatives. In that case, diphenylmethane diisocyanate may more preferably comprise up to 10 wt %, with further particular preference up to 5 wt %, of carbodiimide-, uretdione- or uretonimine-modified diphenylmethane diisocyanate, especially carbodiimide-modified diphenylmethane diisocyanate.

Polyisocyanates (a) may also be used in the form of polyisocyanate prepolymers. These polyisocyanate prepolymers are obtainable by reacting above-described polyisocyanates (constituent (a-1)) in excess, for example at temperatures of 30 to 100° C., preferably at about 80° C., with polyols (constituent (a-2)), to form the prepolymer. The NCO content of polyisocyanate prepolymers of the invention is preferably from 5 to 32 wt % of NCO, more preferably from 15 to 28 wt % of NCO.

Polyols (a-2) are known to the skilled person and are described for example in "Kunststoffhandbuch, 7, Polyurethane", Carl Hanser-Verlag, 3rd edition 1993, section 3.1. Examples of polyols which can be used, accordingly, are polyetherols or polyesterols, such as the polyols described below under (d). Preferred polyols (a-2) used are polyols containing secondary OH groups, such as polypropylene oxide, for example. These polyols (a-2) preferably possess a functionality of 2 to 6, more preferably of 2 to 4 and especially 2 to 3. The polyols (a-2), furthermore, may comprise polyesterols containing hydrophobic substances, as described under (b).

It is additionally possible, optionally, for chain extenders (a-3) to be added to the reaction to form the polyisocyanate prepolymer. Suitable chain extenders (a-3) for the prepolymer are dihydric or trihydric alcohols, for example dipropylene glycol and/or tripropylene glycol, or the adducts of dipropylene glycol and/or tripropylene glycol with alkylene oxides, preferably dipropylene glycol. Suitable chain extenders are also described under (d).

Polyisocyanate prepolymers of these kinds are described for example in U.S. Pat. No. 3,883,571, WO 02/10250 and U.S. Pat. No. 4,229,347.

Particularly preferred for use as polyisocyanate (a) is diphenylmethane diisocyanate or a polyisocyanate prepolymer based on monomeric 4,4'-diphenylmethane diisocyanate or mixtures of 4,4'-diphenylmethane diisocyanate with its derivatives and polypropylene oxide having a functionality of 2 to 4, and also, optionally, dipropylene glycol.

Employed as component (b) is a mixture obtainable by introducing an alkali metal or alkaline earth metal salt into a compound containing urethane groups.

The alkali metal or alkaline earth metal salt used in this context is a compound which accelerates the reaction between isocyanates (a), the compounds (c) containing one or more epoxide groups, and, optionally, polyols (d). These compounds encompass, in particular, salts of sodium, lithium, magnesium and potassium, and ammonium compounds, preferably lithium or magnesium, with any desired anions, preferably with anions of organic acids such as carboxylates and, more preferably, of inorganic acids, such as nitrates, halides, sulfates, sulfites and phosphates, more preferably still with anions of monoprotic acids, such as nitrates or halides, and especially nitrates, chlorides, bromides or iodides. Alkali metal hydroxides as well can be used. Particular preference is given to using lithium chloride, lithium bromide and magnesium dichloride, and especially lithium chloride. Alkali metal or alkaline earth metal salts of the invention may be used individually or as mixtures.

Besides the alkali metal or alkaline earth metal salt, there are preferably no further compounds used which accelerate the reaction of isocyanates with isocyanate-reactive groups.

Compound (b) containing urethane groups is understood to comprise any desired compounds which at 20° C. are present in solid or liquid form and contain at least one urethane group R—NH—CO—R'. R and R' here are organic radicals, and R is not hydrogen and is not COR". R and R' preferably, independently of one another, are substituted or unsubstituted hydrocarbyl radicals having preferably 1 to 50 carbon atoms. The compound containing urethane groups in component (b) is preferably obtainable by reaction of a second polyisocyanate and a compound having at least one OH group. Preferred in this context are compounds which are liquid at 50° C., more preferably at room temperature. For the purposes of the present invention, a substance or component which is "liquid" is one which at the specified temperature has a viscosity of not more than 10 Pas. If no temperature is specified, the datum is based on 20° C. Measurement in this context takes place in accordance with ASTM D445-11. The compounds containing urethane groups preferably have at least two urethane groups. The molecular weight of the compounds containing urethane groups is preferably in the range from 200 to 15 000 g/mol, more preferably 300 to 10 000 g/mol and more particularly 500 to 1300 g/mol. Compounds containing urethane groups may be obtained, for example, by reaction of aforementioned isocyanates (a1) as second isocyanate with compounds which have at least one isocyanate-reactive hydrogen atom, such as alcohols, for example monoalcohols, such as methanol, ethanol, propanol, butanol, pentanol, hexanol or longer-chain propoxylated or ethoxylated monools, such as poly(ethylene oxide) monomethyl ethers, such as the monofunctional Pluriol® products from BASF, for example, dialcohols, such as ethylene glycol, diethylene glycol, triethylene glycol, propylene glycol, dipropylene glycol, butanediol, hexanediol, and/or reaction products of said isocyanates with the polyols and/or chain extenders (d) described below—individually or in mixtures. For preparing the compound containing urethane groups it is possible to employ not only isocyanates but also polyols in a stoichiometric excess. Where monoalcohols are used, isocyanate groups and OH groups may also be used in a stoichiometric ratio. Preference is given to using monoalcohols. Where the compound containing urethane groups has two or more isocyanate groups per molecule, these groups may wholly or partly replace the polyisocyanates (a). The reaction takes place customarily at temperatures between 20 and 120° C., as for example at 80° C. The second isocyanate used for preparing the compound containing urethane groups is preferably an isomer or homologue of diphenylmethane diisocyanate. With particular preference the second isocyanate is monomeric diphenylmethane diisocyanate, for example 2,2'-diphenylmethane diisocyanate, 2,4'-diphenylmethane diisocyanate, 4,4'-diphenylmethane diisocyanate or a mixtures thereof. Diphenylmethane diisocyanate in this case may also be used as a mixture with its derivatives. Diphenylmethane diisocyanate here may with particular preference contain up to 10 wt %, with further particular preference up to 5 wt %, of carbodiimide-, uretdione-, or uretonimine-modified diphenylmethane diisocyanate, especially carbodiimido-modified diphenylmethane diisocyanate. In one particularly preferred embodiment the first isocyanate (a) and the second isocyanate for preparing the compound containing urethane groups are identical.

The compound containing urethane groups may also be obtained via alternative reaction pathways, as for example by reacting a carbonate with a monoamine to produce a urethane group. For this purpose, for example, a propylene carbonate is reacted in a slight excess (1.1 eq) with a monoamine, e.g. a Jeffamin M 600, at 100° C. The resultant urethane may likewise be employed as compound containing urethane group.

The mixtures comprising the alkali metal or alkaline earth metal salt and a compound containing urethane groups may be obtained, for example, by mixing the alkali metal or alkaline earth metal salt into the compound containing urethane groups, preferably in the liquid state, for example at room temperature or at elevated temperature. This can be done using any mixer, an example being a simple stirrer. In this case the alkali metal or alkaline earth metal salt may be employed as the pure substance or in the form of a solution, for example in mono- or polyfunctional alcohols, such as methanol, ethanol or chain extender, or water. In one particularly preferred embodiment, the dissolved salt is added directly to commercially available, prepolymer-based isocyanate. Suitability for this purpose is possessed for example by isocyanate prepolymers having an NCO content of 15 to 30%, based in particular on diphenylmethane diisocyanate and a polyether polyol. Isocyanates of this kind are commercially available, for example, from BASF under the trade name Lupranat® MP 102.

In one particularly preferred embodiment of the present invention, the alkali metal or alkaline earth metal salt is dissolved in a compound having isocyanate-reactive hydrogen atoms, and this solution is then mixed with the isocyanate, optionally at elevated temperature.

With particular preference the compound containing urethane groups is prepared using a monool having a molecular weight of 30 to 15 000 g/mol, preferably 100 to 900 g/mol and, in one particularly preferred embodiment, of 400 to 600 g/mol.

The molar amount of alkali metal or alkaline earth metal ions per mole of urethane group in the compound (b) is 0.0001 to 3.5, preferably 0.01 to 1.0, more preferably 0.05 to 0.9 and more particularly 0.3 to 0.8.

The molar amount of alkali metal or alkaline earth metal ions per mole of isocyanate group in the first polyisocyanate (a) and also, if present, in the complex compound (b) is preferably 0.0001 to 0.3, more preferably 0.0005 to 0.02 and more particularly 0.001 to 0.01.

Between the alkali metal or alkaline earth metal salt in the mixture (b) there is preferably, at 25° C., a thermally reversible interaction with the urethane-group-containing compounds as component (b), whereas at temperatures greater than 50° C., preferably from 60 to 200° C. and more particularly from 80 to 200° C., the catalytically active compound is in free form. For the purposes of the invention, a thermally reversible interaction is assumed if the open time of the reaction mixture at 25° C. is longer by a factor of at least 5, more preferably at least 10 and more particularly at least 20 than at 130° C. The open time here is defined as the time within which the viscosity of the reaction mixture at constant temperature increases to an extent such that the required stirring force exceeds the given stirring force of the Shyodu Gel Timer, model 100, version 2012. For this purpose 200 g portions of reaction mixture were prepared, and were mixed in a Speedmixer at 1950 rpm for 1 minute, and 130 g of the mixture were stirred at room temperature or elevated reaction temperature in the oven, in a PP beaker with a diameter of 7 cm, by means of a Shyodu Gel Timer, model 100, version 2012 and an associated wire stirrer at 20 rpm, until the viscosity and hence the required stirring force for the reactive mixture exceeded the stirring force of the Gel Timer.

As compound (c) containing one or more epoxide groups it is possible to use all epoxide-containing compounds which are customarily used for preparing epoxy resins. The compounds (c) containing epoxide groups are preferably liquid at 25° C. It is also possible to use mixtures of such compounds, which are preferably likewise liquid at 25° C.

Examples of those compounds containing epoxide groups that can be used for the purposes of the invention are I) Polyglycidyl and poly([beta]-methylglycidyl) esters, obtainable by reacting a compound having at least two carboxyl groups in the molecule with in each case epichlorohydrin and [beta]-methylepichlorohydrin. This reaction is advantageously catalysed by the presence of bases.

Aliphatic polycarboxylic acids may be used, for example, as a compound having at least two carboxyl groups. Examples of such aliphatic polycarboxylic acids are oxalic acid, succinic acid, glutaric acid, adipic acid, pimelic acid, suberic acid, azeleic acid and dimerized or trimerized linoleic acid. Additionally it is possible for cyclic, aliphatic acids to be used as well, such as tetrahydrophthalic acid, 4-methyltetrahydrophthalic acid, hexahydrophthalic acid or 4-methylhexahydrophthalic acid. Aromatic carboxylic acids too, such as phthalic acid, isophthalic acid or terephthalic acid, and also any desired mixtures of these carboxylic acids, may be used.

II) Polyglycidyl or poly([beta]-methylglycidyl) ether, obtainable by reaction of a compound having at least two alcohol hydroxyl groups and/or phenolic hydroxyl groups with epichlorohydrin or [beta]-methylepichlorohydrin under alkaline conditions or in the presence of an acidic catalyst, and subsequent treatment with a base.

The glycidyl ethers of this type are derived for example from linear alcohols, such as ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycol, pentane-1,5-diol, hexane-1,6-diol, hexane-2,4,6-triol, glycerol, 1,1,1-trimethylolpropane, pentaerythritol or sorbitol, and from polyepichlorohydrins.

Further glycidyl ethers of this type are obtainable from cycloaliphatic alcohols, such as 1,4-cyclohexanedimethanol, bis(4-hydroxycyclohexyl)methane or 2,2-bis(4-hydroxycyclo-hexyl)propane, or from alcohols which carry aromatic groups and/or other functional groups, such as N,N-bis(2-hydroxyethyl)aniline or p,p'-bis(2-hydroxyethylamino)diphenylmethane.

The glycidyl ethers may also be based on monocyclic phenols, such as p-tert-butylphenol, resorcinol or hydroquinone, or on polycyclic phenols, such as bis(4-hydroxyphenyl)methane, 4,4'-dihydroxybiphenyl, bis(4-hydroxyphenyl) sulfone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Further compounds containing hydroxyl groups and suitable for the preparation of the glycidyl ethers are novolacs, obtainable by condensing aldehydes, such as formaldehyde, acetaldehyde, chloraldehyde or furfuraldehyde, with phenols or bisphenols, which may be unsubstituted or substituted, by chlorine atoms or C1 to C9 alkyl groups, for example, such as phenol, 4-chlorophenol, 2-methylphenol or 4-tert-butylphenol.

III) Poly(N-glycidyl) compounds, obtainable by dehydrochlorination of reaction products of epichlorohydrin with amines containing at least two amine-bonded hydrogen atoms. Such amines are, for example, aniline, n-butylamine, bis(4-aminophenyl)methane, m-xylylenediamine or bis(4-methylaminophenyl)methane. The poly(N-glycidyl) compounds also include triglycidyl isocyanurates, N,N'-diglycidyl derivatives of cycloalkyleneureas, like ethyleneurea or 1,3-propyleneurea, and diglycidyl derivatives of hydantoins, like 5,5-dimethylhydantoin.

IV) Poly(S-glycidyl) compounds, such as di-S-glycidyl derivates, which are obtainable from dithiols, for example ethane-1,2-dithiol or bis(4-mercaptomethylphenyl) ether.

V) Cycloaliphatic epoxy resins, such as bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate.

VI) Monofunctional epoxy resins, such as 2-ethylhexyl glycidyl ether, isopropyl glycidyl ether, butyl glycidyl ether or cresyl glycidyl ether.

In the context of the invention it is likewise possible to use epoxy resins wherein the 1,2-epoxy group is bonded to different heteroatoms or functional groups. These compounds include N,N,O-triglycidyl derivatives of 4-aminophenol, the glycidyl ether glycidyl ester of salicylic acid, N-glycidyl-N'-(2-glycidyloxypropyl)-5,5-dinnethylhydantoin and 2-glycidyloxy-1,3-bis(5,5-dimethyl-1-glycidylhydantoin-3-yl)propane.

Particularly preferred as component (c) are the compounds of classes (I) and (II), more particularly those of class (II).

The compound (c) containing one or more epoxide groups is used preferably in an amount such that the equivalents ratio of epoxide group to isocyanate group in the polyisocyanates (a) and also, optionally, isocyanate groups contained in the complex compound (b) is 0.1 to 2.0, preferably 0.2 to 1.8 and more preferably 0.3 to 1.0. A higher epoxide fraction leads to a greater level of exothermic heat production and therefore, in general, to more rapid curing at elevated temperature, and vice-versa.

The molar amount of alkali metal or alkaline earth metal ions per mole of epoxy group is preferably greater than 0.00001 and with particular preference is 0.00005 to 0.3.

As compounds having at least two isocyanate-reactive groups, comprising compounds having $NH_2$ and/or primary OH groups, (d), it is possible to use any desired compounds known within polyurethane chemistry that have at least two isocyanate-reactive groups. These compounds encompass compounds of relatively high molecular weight, having a molecular weight of at least 350 g/mol, at least 400 g/mol and more preferably at least 500 g/mol, examples being polyamines, and polyols, such as polyetherols and polyesterols. Where there is a molecular weight distribution, the basis for the purposes of the present invention is the number-average molecular weight, unless explicitly stated otherwise. Besides compounds of relatively high molecular weight having at least two isocyanate-reactive groups, it is possible for chain extenders, crosslinking agents or else, optionally, mixtures thereof to be employed in component (d), for the purpose, for example, of modifying the mechanical properties, such as the hardness.

Where low molecular weight chain extenders and/or crosslinking agents are used, chain extenders known in connection with the preparation of polyurethanes may be employed. These are preferably compounds of low molecular weight and having at least two isocyanate-reactive groups, with molecular weights of less than 350 g/mol, more preferably from 60 to less than 35 g/mol. Examples of those contemplated include aliphatic, cycloaliphatic and/or araliphatic or aromatic diols having 2 to 14, preferably 2 to 10, carbon atoms, such as ethylene glycol, 1,3-propanediol, 1,4-butanediol, 1,6-hexanediol, 1,10-decanediol and bis-(2-hydroxyethyl)hydroquinone, 1,2-, 1,3- and 1,4-dihydroxycyclohexane, diethylene glycol, dipropylene glycol, tripropylene glycol, triols, such as 1,2,4- and 1,3,5-trihydroxycyclohexane, glycerol and trimethylolpropane, and hydroxyl-containing polyalkylene oxides of low molecular weight that are based on ethylene oxide and/or 1,2-propylene oxide and on the aforementioned diols and/or triols as starter molecules. Further possible chain extenders and/or crosslinking agents of low molecular weight are specified for example in "Kunststoffhandbuch, Volume 7, Polyurethane", Carl Hanser Verlag, 3rd edition 1993, sections 3.2 and 3.3.2. Preference is given to using less than 50 wt %, more preferably 5 to 30 wt %, very preferably 10 to 20 wt % of chain extenders and/or crosslinking agents, based in each case on the total weight of the compounds of components (b).

As polyols it is possible in the compound (d) to use, for example, polyethers, polycarbonate polyols or polyesters that are known within polyurethane chemistry. The polyols preferably employed are polyether polyols and/or polyesterols having number-average molecular weights of between 350 and 12 000, preferably 400 to 6000, more particularly 500 to less than 3000, and preferably having an average, nominal functionality of 2 to 6, preferably 2 to 3. The number-average molecular weights are customarily obtained here by determining the OH number in accordance with DIN 53240 and then calculating in accordance with the formula $M_n$=Fn*1000*56.1/OH number, the functionality used being the nominal functionality.

Polyether polyols and/or polyesterols having 2 to 8 isocyanate-reactive hydrogen atoms are commonly employed. The OH number of these compounds is customarily in the range from 20 to 850 mg KOH/g, preferably in the range of 50 and 600 mg KOH/g.

The polyether polyols are obtained in the presence of catalysts by known methods, as for example by anionic polymerization of alkylene oxides with addition of at least one starter molecule, containing 2 to 8, preferably 2 to 6 and more preferably 2 to 4 reactive hydrogen atoms in bound form. Catalysts used may be alkali metal hydroxides, such as sodium or potassium hydroxide, or alkali metal alkoxides, such as sodium methoxide, sodium or potassium ethoxide or potassium isopropoxide, or Lewis acids in the case of cationic polymerization, such as antimony pentachloride, boron trifluoride etherate or bleaching earth as catalysts. As catalysts it is additionally possible to use double metal cyanide compounds, known as DMC catalysts. For polyether polyols having hydroxyl numbers>200 mg KOH/g, a tertiary amine, such as imidazole, for example, may also be employed as catalyst. Such polyols are described for example in WO 2011/107367.

As alkylene oxides, use is made preferably of one or more compounds having 2 to 4 carbon atoms in the alkylene radical, such as ethylene oxide, tetrahydrofuran, 1,2-propylene oxide, or 1,2- and/or 2,3-butylene oxide, in each case alone or in the form of mixtures, and preferably ethylene oxide, 1,2-propylene oxide, 1,2-butylene oxide and/or 2,3-butylene oxide, especially ethylene oxide and/or 1,2-propylene oxide.

Starter molecules contemplated include, for example, ethylene glycol, diethylene glycol, glycerol, trimethylolpropane, pentaerythritol, sugar derivatives, such as sucrose, hexitol derivates, such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3,-propanediamine, 1,6-hexanediamine, ethanolamine, diethanolamine, triethanolamine, and also other di- or polyhydric alcohols or mono- or polyfunctional amines.

The polyester alcohols used are usually prepared by condensation of polyfunctional alcohols having 2 to 12 carbon atoms, such as ethylene glycol, diethylene glycol, butanediol, trimethylolpropane, glycerol or pentaerythritol, with polybasic carboxylic acids having 2 to 12 carbon atoms, examples being succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomers of naphthalinedicarboxylic acids, or their anhydrides.

As further starting materials when preparing the polyesters it is also possible to use hydrophobic substances. The hydrophobic substances are water-insoluble substances which contain an apolar organic radical and also possess at least one reactive group selected from hydroxyl, carboxylic acid, carboxylic ester or mixtures thereof. The equivalent weight of the hydrophobic materials is preferably between 130 and 1000 g/mol. Use may be made, for example, of fatty acids, such as stearic acid, oleic acid, palmitic acid, lauric acid or linoleic acid, and also fats and oils, such as castor oil, corn oil, sunflower oil, soybean oil, coconut oil, olive oil or tall oil, for example. Where polyesters contain hydrophobic substances, the fraction of the hydrophobic substances as a proportion of the total monomer content of the polyester alcohol is preferably 1 to 30 mol %, more preferably 4 to 15 mol %.

The polyesterols used preferably have a functionality of 1.5 to 5, more preferably 1.8-3.5.

In order to prepare particularly hydrophobic reaction mixtures, as for example when the condensative incorporation of water is to be prevented during the long open time, or when the polyurethane-polyisocyanurate compound of the invention is to be particularly stable towards hydrolysis, the polyol used may also comprise a hydroxyl-functionalized hydrophobic compound, such as a hydroxy-functionalized compound from fat chemistry.

There are a series of hydroxyl-functional compounds from fat chemistry that are known and can be used. Examples are castor oil, hydroxyl-modified oils such as grape seed oil, black cumin oil, pumpkin seed oil, borage seed oil, soybean oil, wheatgerm oil, rapeseed oil, sunflower oil, peanut oil, apricot kernel oil, pistachio kernel oil, almond oil, olive oil, macadamia nut oil, avocado oil, sea buckthorn oil, sesame oil, hazelnut oil, evening primrose oil, wild rose oil, hemp oil, thistle oil, walnut oil, hydroxyl-modified fatty acid esters based on myristoleic acid, palmitoleic acid, oleic acid, vaccinic acid, petroselinic acid, gadoleic acid, erucic acid, nervonic acid, linoleic acid, linolenic acid, stearidonic acid, arachidonic acid, timnodonic acid, clupanodonic acid, cervonic acid. Preference here is given to using castor oil and reaction products thereof with alkylene oxides or ketone-formaldehyde resins. Last-mentioned compounds are sold for example by Bayer AG under the name Desmophen® 1150.

A further group of fatty-chemical polyols used with preference may be obtained through ring opening of epoxidized fatty acid esters with simultaneous reaction with alcohols and, optionally, subsequent further transesterification reactions. The incorporation of hydroxyl groups into oils and fats is accomplished primarily by epoxidation of the olefinic double bond present in these products, followed by the reaction of the resultant epoxide groups with a mono- or polyhydric alcohol. This produces, from the epoxide ring, a hydroxyl group or, in the case of polyfunctional alcohols, a structure having a higher number of OH groups. Since oils and fats are usually glycerol esters, parallel transesterification reactions run additionally during the reactions specified above. The compounds obtained accordingly preferably have a molecular weight in the range between 500 and 1500 g/mol. Products of this kind are available, for example, from BASF under the Sovermole® product name.

As compounds having —$NH_2$ groups, preference is given to using polyoxyalkylenamines, known as polyetheramines. Such polyoxyalkylenamines are preferably amine-terminated polyalkylene oxides, generally polyoxyethylene and/or polyoxypropylene oxides, which have a functionality of two or more, and have number-average molecular weights of at least 350 g/mol, as for example between 350 and 6000 g mol$^{-1}$, preferably from 380 to 5100 g mol$^{-1}$. Also possible is the use of amine-terminated polytetrahydrofuran (PTHF). The amine groups of the polyetheramines are primary amine groups. It is also possible for just a single polyetheramine to be used. The polyetheramines (b) are, in particular, diamines or triamines. Compounds of these kinds are sold for example by Huntsman under the Jeffamine® name and by BASF as polyetheramines under the Baxxodur® name.

Polyamines are generally prepared by catalytic amination of the corresponding polyalcohols. The preparation of the polyether alcohols and polyester alcohols which are preferably aminated has already been disclosed above in connection with the description of component (a2). In particular, polypropylene oxides with a functionality of 2 or 3 are reacted to form corresponding di- or triamines.

It is essential to the invention here that the compounds having at least two isocyanate-reactive groups comprise compounds having —$NH_2$ groups or OH groups (d). With particular preference, component (d) comprises polyether polyol having on average at least 50%, for example 50% to 100%, more preferably 75% to 100%, and more particularly 90% to 100% of primary OH groups. The fraction of —$NH_2$ groups and primary OH groups overall in the sum total of NH2 groups and OH groups in component (d) is at least 50%, more preferably at least 75% to 100%, very preferably 85% to 100%, and more particularly 95% to 100%. Component (d) preferably contains less than 50%, more preferably less than 20%, and in particular no, $NH_2$ groups, based on the sum total of the $NH_2$ groups and OH groups in component (d).

In one particularly preferred embodiment, component (d) contains at least 80 wt % of polyethers, more preferably 90 to 100% wt % of polyethers, based on the total weight of the compounds of component (d). During polyether preparation in particular, care should be taken to ensure that polyethers prepared alkalinically contain no substantial residue of catalyst. The residual amount of alkali metal in component (d) is preferably less than 100 ppm, more preferably less than 50 ppm, more preferably still less than 20 ppm and more particularly less than 10 ppm.

The fraction of the compounds of component (d), based on the total weight of the components (c) and (d), is preferably from 10 to 95 wt %, more preferably from 40 to 85 wt % and more particularly from 60 to 80 wt %.

Component (d) preferably contains less than 0.01 wt % of alkali metal or alkaline earth metal ions, based on the total weight of component (d). More preferably the amount of alkali metal or alkaline earth metal ions in component (d) is less than 0.005, more preferably 0.003 and more particularly 0.001 wt %, based on the total weight of component (d).

Components (c) and (d) preferably contain less than 0.01 wt %, based on the total weight of components (c) and (d), of alkali metal or alkaline earth metal ions. With particular preference the amount of alkali metal or alkaline earth metal ions in components (c) and (d) is less than 0.005, more preferably 0.003 and more particularly 0.001 wt %, based on the total weight of components (c) and (d).

Components (c), (d) and (e) further preferably contain less than 0.01 wt %, based on the total weight of components (c), (d) and (e), of alkali metal or alkaline earth metal ions. With particular preference the amount of alkali metal or alkaline earth metal ions in components (c), (d) and (e) is less than 0.005, more preferably 0.003 and more particularly 0.001 wt %, based on the total weight of components (c), (d) and (e).

As fillers and further additives (e) it is possible to use customary fillers, and other adjuvants, such as additives for water adsorption, flame retardants, hydrolysis inhibitors, antioxidants and internal release agents. Such substances are stated by way of example in "Kunststoffhandbuch, Volume 7, Polyurethane", Carl Hanser Verlag, 3rd edition 1993, sections 3.4.4 and 3.4.6 to 3.4.11.

Fillers, especially reinforcing fillers, are the customary organic and inorganic fillers, reinforcing agents, etc., that are known per se. Specific examples would include the following: inorganic fillers such as silicatic minerals, examples being finely ground quartzes, phyllosilicates, such as antigorite, serpentine, hornblendes, amphibole, chrysotile, and talc; metal oxides, such as kaolin, aluminium oxides, titanium oxides and iron oxides, metal salts such as chalk, heavy spar and inorganic pigments, such as cadmium sulfide, zinc sulfide, and also glass etc. Preference is given to using kaolin (china clay), finely ground quartzes, aluminium silicate and coprecipitates of barium sulfate and aluminium silicate, and also natural and synthetic minerals in fibre form such as wollastonite, metal fibres and glass fibres of different lengths, which may optionally have been sized. Examples of organic fillers contemplated include the following: charcoal, melamine, rosin, cyclopentadienyl resins and graft polymers, and also cellulose fibres, polyamide, polyacrylonitrile, polyurethane and polyester fibres based on aromatic and/or aliphatic dicarboxylic esters, and especially carbon fibres.

Preferred fillers used are those having an average particle diameter of 0.1 to 500, more preferably of 1 to 100 and more particularly of 1 to 10 µm. Diameter here in the case of non-spherical particles refers to their extent along the shortest axis in space. In the case of non-spherical particles, examples being fibres, such as glass fibres, the extent along their longest axis in space is preferably less than 500 µm, more preferably less than 300 µm. Preferred for use as fillers are glass fibres or finely ground quartzes. Use may also be made of crosslinked fillers, examples being woven fabric mats, such as glass fibre mats, carbon fibre mats or natural fibre mats, as fillers. These fillers are identified as reinforcing agents in the context of the invention.

The inorganic and organic fillers may be used individually or as mixtures and are incorporated into the reaction mixture advantageously in amounts from 0.5 to 30 wt %, preferably 1 to 20 wt %, based on the weight of components (a) to (e).

Preferred additives for water adsorption that are used are aluminosilicates, selected from the group of the sodium aluminosilicates, potassium aluminosilicates, calcium aluminosilicates, caesium aluminosilicates, barium aluminosilicates, magnesium aluminosilicates, strontium aluminosilicates, sodium aluminophosphates, potassium aluminophosphates, calcium aluminophosphates and mixtures thereof. Particular preference is given to using mixtures of sodium, potassium and calcium aluminosilicates in a castor oil vehicle.

The additive for water absorption preferably has an average particle size of not greater than 200 µm, more preferably not greater than 150 µm and in particular not greater than 100 µm. The pore size of the additive of the invention for water absorption is preferably 2 to 5 angstroms. Besides the inorganic additives for water adsorption, it is also possible to use known organic additives for water adsorption, such as orthoformates, an example being triisopropyl orthoformate.

If an additive for water absorption is added, this is preferably in amounts greater than one part by weight, more preferably in the range from 1.2 to 2 parts by weight, based on the total weight of the polymeric system.

If foams are to be produced, it is also possible, instead of water scavengers, to use chemical and/or physical blowing agents that are customary within polyurethane chemistry. Chemical blowing agents are understood to be compounds which as a result of reaction with isocyanate form gaseous products, such as water or formic acid, for example. Physical blowing agents are understood to be compounds which are present in solution or emulsion in the ingredients of polyurethane preparation and which evaporate under the conditions of polyurethane formation. Examples are hydrocarbons, halogenated hydrocarbons, and other compounds, such as, for example, perfluorinated alkanes, such as perfluorohexane, fluorochlorohydrocarbons, and ethers, esters, ketones, acetals or mixtures thereof, as for example (cyclo) aliphatic hydrocarbons having 4 to 8 carbon atoms, or hydrofluorocarbons, such as Solkane® 365 mfc from Solvay Fluorides LLC. With preference no blowing agent is added.

Flame retardants which can be used are, in general, the flame retardants known from the prior art. Examples of suitable flame retardants are brominated ethers (Ixol B 251), brominated alcohols, such as dibromoneopentyl alcohol, tribromoneopentyl alcohol and PHT-4 diol, and also chlorinated phosphates, such as, for example, tris(2-chloroethyl) phosphate, tris(2-chloroisopropyl) phosphate (TCPP), tris(1, 3-dichloroisopropyl) phosphate, tris(2,3-dibromopropyl) phosphate and tetrakis(2-chloroethyl)ethylene diphosphate, or mixtures thereof.

Besides the halogen-substituted phosphates already stated, it is also possible for inorganic flame retardants, such as red phosphorus, preparations containing red phosphorus, expandable graphite, aluminium oxide hydrate, antimony trioxide, arsenic oxide, ammonium polyphosphate and calcium sulfate, or cyanuric acid derivatives, such as melamine, or mixtures of at least two flame retardants, such as ammonium polyphosphates and melamine, and also, optionally, starch, to be used in order to impart flame retardancy to the polyurethane-polyisocyanurate foams produced in accordance with the invention.

As further liquid, halogen-free flame retardants it is possible to use diethyl ethanephosphonate (DEEP), triethyl phosphate (TEP), dimethyl propylphosphonate (DMPP), diphenyl cresyl phosphate (DPK) and others.

In the context of the present invention, the flame retardants are used preferably in an amount of 0 to 60 wt %, more preferably of 5 to 50 wt %, more particularly of 5 to 40 wt %, based on the total weight of components (b) to (e).

Internal release agents which can be used are all release agents customary in the preparation of polyurethanes, examples being metal salts in solution in diamine, such as zinc stearate, and derivatives of polyisobutylenesuccinic acid.

A polymeric system of the invention preferably contains less than 0.5 wt %, more preferably less than 0.3 wt %, of water, based on the total weight of components (b) to (e).

The polyurethane-polyisocyanurate compounds of the invention are prepared by mixing components (a) to (d) and optionally (e) to form a reaction mixture and reacting the reaction mixture to form the polyurethane-polyisocyanurate compound. For the purposes of the invention here, the mixture of components (a) to (e) is referred to as a reaction mixture at reaction conversions of less than 90%, based on the isocyanate groups. Individual components may already have been premixed. Thus, for example, polyisocyanates (a) and the mixture obtainable by introducing an alkali metal or alkaline earth metal salt into a compound (b) containing urethane groups may be premixed, provided that component (b) contains no isocyanate-reactive groups. Likewise, components (c), (d) and optionally (e) may be premixed. If component (b) contains no isocyanate groups, component (b) as well can be added to this mixture. With preference the compounds (c) containing one or more epoxide groups and the one or more compounds having at least two isocyanate-reactive groups, comprising compounds having $NH_2$ and/or primary OH groups (d), and optionally fillers and additives (e), are mixed to form a polyol component before being mixed with isocyanate (a).

Reaction mixtures of the invention have a long open time at 25° C., of more than 60 minutes for example, preferably of more than 90 minutes and more preferably of more than 120 minutes. The open time here is determined as described above, via the increase in viscosity. Raising the temperature to temperatures greater than 70° C., preferably greater than 80 to 200° C. and more preferably to 90 to 150° C. cures the reaction mixture of the invention rapidly, in less than 50 minutes, for example, preferably in less than 30 minutes, more preferably in less than 10 minutes, and more particularly in less than 5 minutes. Curing of a reaction mixture of the invention refers, for the purposes of the invention, to the increase from the initial viscosity to ten times the initial viscosity. The difference between the open time at 25° C. and the open time at 130° C. here is preferably at least 40 minutes, more preferably at least an hour and very preferably at least 2 hours.

The isocyanate index for a process of the invention is greater than 150, for example from 160 to 5000, preferably from 180 to 1000. The isocyanate index in the context of the present invention refers to the stoichiometric ratio of isocyanate groups to isocyanate-reactive groups, multiplied by 100. Isocyanate-reactive groups are all groups reactive with isocyanate that are present in the reaction mixture, including chemical blowing agents and compounds having epoxide groups, but not the isocyanate group itself.

With the process of the invention, preferably, a compact material is obtained; in other words, no blowing agent is added. Small amounts of blowing agent, for example small amounts of water which condense into the reaction mixture or the starting components in the course of processing, via atmospheric humidity, are not included in the last statement. A compact polyurethane-polyisocyanurate compound refers to a polyurethane-polyisocyanurate compound which is substantially free from gas inclusions. The density of a compact polyurethane-polyisocyanurate compound is preferably greater than 0.8 $g/cm^3$, more preferably greater than 0.9 $g/cm^3$ and more particularly greater than 1.0 $g/cm^3$.

The polyurethane-polyisocyanurate compounds of the invention can be employed for all kinds of polyisocyanate polyaddition products for whose production a long open time and rapid curing of the reaction mixture are advantageous. An isocyanate index of greater than 150, more preferably of greater than 250, is selected here when the resulting polyurethane-polyisocyanurate compounds are to have particular temperature stability and flame retardancy. The polyisocyanate polyaddition products of the invention have a particularly high glass transition temperature of preferably at least 150° C., more preferably at least 170° C. and more particularly at least 200° C., a high heat deflection temperature (HDT), and outstanding mechanical properties. The glass transition temperature here is determined by Dynamic Mechanical Analysis (DMA) at a frequency f=1 Hz in accordance with DIN EN ISO 6721-1:2011, and the glass transition temperature Tg is evaluated from the maximum of the loss factor tan d and the loss modulus G". The heat deflection temperature is determined in accordance with DIN EN ISO 75. The process of the invention is used preferably for producing fibre composite components. For this purpose, customary fibres, such as glass fibres or carbon fibres, more particularly fibre mats, are wetted with the reaction mixture. The reaction mixture of the invention can also be used to produce honeycomb composite materials, such as door elements in automotive engineering. The reaction mixture can also be used in a vacuum infusion process for producing structural sandwich components, such as vehicle parts, examples being aircraft parts or exterior automotive trim, or rotors for wind energy systems. Examples of further uses include pultrusion, fibre winding processes, and all applications where a long open time and rapid curing of the polymeric component and also good mechanical properties, such as high impact toughness, are advantages. These articles can be produced by customary methods in customary moulds, which are preferably heatable.

Particularly advantageous for processing are the particularly high differences between the open time at room temperature and the open time at 120° C. This difference amounts advantageously at room temperature to at least 30 minutes and at 120° C., as far as possible, less than 60 seconds. Moreover, long open times and rapid demoulding times at 120° C. are advantageous for fibre impregnation applications. Particularly suitable are open times>30 s and demoulding times <90 s at 120° C.

With preference, apart from the alkali metal or alkaline earth metal salt used in component (b), the process of the invention uses no compounds for accelerating the isocyanate-polyol reaction, and more particularly none of the customary polyurethane catalysts based on compounds having tertiary amine groups, or polyisocyanurate catalysts, such as potassium acetate. The polyurethane-polyisocyanurate compounds of the invention are notable for outstanding mechanical properties, which can be varied within wide limits.

A further subject of the present invention is the polyurethane-polyisocyanurate compound obtainable by a process of the invention, and the use of a polyurethane-polyisocyanurate compound of the invention for producing a large number of composite materials, for example in resin transfer moulding (RTM), resin injection moulding (RIM) or structural reaction injection moulding (SRIM), for the production, for example, of bodywork components for vehicles, door or window frames or honeycomb-reinforced components, in vacuum-assisted resin infusion, for production, for example, of structural components for vehicles or wind turbines, in filament winding, in order, for example, to produce pressure-stable containers or tanks, in rotational casting, in order, for example, to produce pipes and pipe coatings, and in pultrusion, in order to produce, for example, door profiles and window profiles, fibre-reinforced components for vehicles, wind turbines, antennas or leads and reinforcing rods for concrete. The polyurethane-polyisocyanurate compound of the invention may additionally be used for producing prepregs for sheet moulding compounding (SMC) or bulk moulding compound (BMC), for example. The composites comprising the inventively produced polyurethane-polyisocyanurate compound may additionally be employed, for example, for high-volume production of parts for motor vehicles, components for trains, air travel and space travel, marine applications, wind turbines, structural components, adhesives, packaging, encapsulating materials and insulators. The polyurethane-polyisocyanurate compound of the invention can also be used without fibre reinforcement, as pure casting material, as adhesives or coatings for pipe coatings, for example. The polyurethane-polyisocyanurate compound prepared by a process of the invention is used preferably for producing bodywork components for motor vehicles, such as bumpers, wheel arches or roof parts.

Surprisingly it has been found that component (b) need be present in a smaller amount than the bidentate or polydentate complexes from the prior art. In contrast to the systems described in WO 10121898, WO 12103965, WO 13098034 and WO 13143841, exclusively monodentate urethane groups of the form R—NH—CO—R in relation to the salt anion and the salt cation are used, with R not being hydrogen. This leads to an increase in effectiveness by a factor of 10, based on the concentration of the catalyst, or to an effectiveness increased by a factor of 3, relative to the open time at 130° C. One possible explanation for this might be that the bidentate or polydentate complexes from the prior art are capable of binding the salt compounds relatively strongly by way of electrostatic interactions.

In the text below, the present invention is to be illustrated using examples:

Starting materials:
Polyol 1 Glycerol-started polyether polyol based on propylene oxide and terminal ethylene oxide, with an OH number of 35 mg KOH/g, a primary OH group content of 72%, based on all OH groups, and an alkalinity of 10 ppm
Polyol 2 Glycerol-started polyether polyol based on propylene oxide and terminal ethylene oxide, with an OH number of 30 mg KOH/g, a primary OH group content of 100%, based on all OH groups, and an alkalinity of 465 ppm
Polyol 3 Propylene glycol-started polyether polyol based on propylene oxide and terminal ethylene oxide, with an OH number of 30 mg KOH/g, a primary OH group content of 83% and an alkalinity of 4 ppm
Polyol 4 Glycerol-started polyether polyol based on propylene oxide, with an OH number of 805 and a secondary OH group content of 100%, based on all OH groups, and an alkalinity of 100 ppm
Polyol 5 Diethylene glycol
Polyol 6 DMC-catalyzed polyether polyol, containing polypropylene glycol as starter, based on propylene oxide, with an OH number of 28 mg KOH/g and a secondary OH group content of 100%, based on all OH groups, and an alkalinity of 0 ppm.
Polyol 7 DMC-catalyzed polyether polyol, castor oil-started, based on propylene oxide/ethylene oxide and terminal propylene oxide, with an OH number of 50 mg KOH/g and a secondary OH group content of 100%, based on all OH groups, and an alkalinity of 0 ppm.
Polyol 8 Propylene glycol-started polyether polyol based on propylene oxide, with an OH number of 55 mg KOH/g, a secondary OH group content of 100%, based on all OH groups, and an alkalinity of 4 ppm
Polyol 9 DMC-catalyzed, propylene glycol-started polyether polyol based on propylene oxide, with an OH number of 55 mg KOH/g and a secondary OH group content of 100%, based on all OH groups, and an alkalinity of 0 ppm.
Polyol 10 Dipropylene glycol
DGE 1 Bisphenol A-based diglycidyl ether, e.g. Araldite GY 250 from Huntsman
DGE 2 Polypropylene glycol diglycidyl ether
ZM1 Reaction product consisting of Iso 3 with a monofunctional polyethylene oxide having a number-average molecular weight of 500 g/mol, obtainable under the trade name "Pluriol® A 500 E" from BASF, mixed with 0.70 eq. of LiCl, based on the number of urethane bonds in the prepolymer
ZM2 Non-inventive mixture of LiCl and urea prepolymer, obtainable by reaction of Jeffamin M600 and Iso 3 and also 0.70 eq. of LiCl, based on the number of urea bonds in the prepolymer, as described in WO10121898.
ZM3 Non-inventive mixture of potassium acetate (40%) in solution in monoethylene glycol (60%)
Iso 1 Prepolymer of 4,4'-diphenylmethane diisocyanate (MDI) and dipropylene glycol, NCO-content 22.9 wt %
Iso 2 Diphenylmethane diisocyanate (MDI) with polycyclic homologues, e.g. "Lupranat® M20" from BASF, NCO content 31.5%
Iso 3 Carbodiimide-modified 4,4'-diphenylmethane diisocyanate (MDI), NCO content 29.5%

Preparation of ZM 1: The monool was charged to a glass vessel and the isocyanate was added with vigorous stirring using a magnetic stirrer. Throughout the synthesis, the temperature was monitored by temperature sensors. Heating then took place to 70° C. until the reaction commenced. If the reaction underwent heating by itself, cooling took place with an ice bath; if the reaction was fairly slow, the temperature was raised further to 90° C. and stirring was carried out for 30 minutes more. After the end of the reaction, the reaction mixture was cooled to room temperature. A viscous oil is obtained. The resulting oil was subsequently mixed with the corresponding amount of LiCl in solution in ethanol, and this mixture was heated to 70° C. and stirred at this temperature for 30 minutes. The reaction mixture was then cooled and excess ethanol was stripped off on a rotary evaporator. This gave a viscous oil.

In accordance with Table 1, a polyol component and an isocyanate component respectively were prepared by mixing the specified components. The quantity figures are in parts by weight, based in each case on the polyol component (A component) or the isocyanate component (B component). The respective polyol and isocyanate components were subsequently mixed at the specified mixing ratio. This mixture was reacted in a mould at 120° C. to form the polyurethane-polyisocyanurate compound. The specified mechanical properties were determined on the polyurethane-polyisocyanurate compounds thus produced.

TABLE 1

| | Example 1 | Example 2 | Comparative 1 | Comparative 2 | Comparative 3 | Comparative 4 | Comparative 5 | Comparative 6 | Comparative 7 | Comparative 8 | Comparative 9 | Example 3 | Example 4 | Example 5 | Comparative 10 |
|---|---|---|---|---|---|---|---|---|---|---|---|---|---|---|---|
| Polyol 1 | 70 | | | | | | | | | | 70 | 70 | 70 | 70 | 70 |
| Polyol 2 | | 70 | | | | | | | | | | | | | |
| Polyol 3 | | | 70 | | | | | | | | | | | | |
| Polyol 4 | | | | 70 | | | | | | | | | | | |
| Polyol 5 | 15 | 15 | 15 | 15 | | | 15 | | | | 15 | 15 | 15 | 15 | 15 |
| Polyol 6 | | | | | | | 70 | | | | | | | | |
| Polyol 7 | | | | | 70 | 70 | | | | | | | | | |
| Polyol 8 | | | | | | | | 70 | | | | | | | |
| Polyol 9 | | | | | | | | | 70 | | | | | | |
| Polyol 10 | | | | | | | | | 15 | | | | | | |
| DGE 1 | 15 | 15 | 15 | 15 | 15 | 15 | 15 | 15 | 15 | 14.85 | 15 | 15 | 15 | 15 | 15 |
| DGE 2 | | | | | | | | | | 0.15 | | | | | |
| ZM3 | | | | | | | | | | | | | | | |
| Sum A | 100 | 100 | 100 | 100 | 100 | 100 | 100 | 100 | 100 | 100 | 100 | 100 | 100 | 100 | 100 |
| Iso 1 | 49 | 49 | 49 | 49 | 49 | 49 | 49 | 49 | 49 | 50 | 49 | 49 | 98 | 98 | 50 |
| Iso 2 | 49 | 49 | 49 | 49 | 49 | 49 | 49 | 49 | 49 | 50 | 49 | 49 | | | 50 |
| ZM1 | 2 | 2 | 2 | 2 | 2 | 2 | 2 | 2 | 2 | | 2 | 2 | 2 | 2 | |
| ZM2 | | | | | | | | | | | | | | | |
| Sum B | 100 | 100 | 100 | 100 | 100 | 100 | 100 | 100 | 100 | 100 | 100 | 100 | 100 | 100 | 100 |
| Mixing ratio A:B [parts by wt.] | 100:500 | 100:500 | 100:500 | 100:500 | 100:500 | 100:500 | 100:500 | 100:500 | 100:500 | 100:500 | 100:500 | 100:500 | 100:500 | 100:500 | 100:500 |
| Index | 757.2 | 769.8 | 304.1 | 229.6 | 889 | 891.7 | 988.8 | 894.9 | 1056 | 768.3 | 757.2 | 757.9 | 637.7 | 876.6 | 772.4 |
| Alkali metal content of A-comp. [ppm] | 10.8 | 6.6 | 329.3 | 73.8 | 6.6 | 3.8 | 3.8 | 3.8 | 6.6 | 16.9 | 10.8 | 10.8 | 10.8 | 10.8 | 10.8 |
| Tensile strength [N/mm²] to DIN EN ISO 527 | 71.4 | 41.1 | n.d. | n.d. | 77.6 | n.d. | n.d. | n.d. | 71.5 | 32.3 | 63.5 | 61.2 | 69.3 | 58.5 | n.m. |
| Elongation at break [%] to DIN EN ISO 527 | 5.6 | 2.6 | n.d. | n.d. | 8.1 | n.d. | n.d. | n.d. | 5.8 | 1.8 | 6.0 | 4.8 | 6.7 | 3.8 | n.m. |
| Tg [° C.] by DMA max G″/max tan delta | 215/225 | 215/235 | n.d. | n.d. | 130/165 | n.d. | n.d. | n.d. | 155/165 | 105/125 | 155/170 | >250 | 190/215 | >250 | n.m. |
| Heat deflection temperature to DIN EN ISO 75 [° C.] | 168 | n.d. | n.d. | n.d. | n.d. | n.d. | n.d. | n.d. | n.d. | 109 | 138 | n.d. | n.d. | n.d. | n.m. |

TABLE 1-continued

| | | | | | | | | | | | | | | | |
|---|---|---|---|---|---|---|---|---|---|---|---|---|---|---|---|
| Elasticity modulus [N/mm²] to DIN EN ISO 527 | 2522 | n.d. | n.d. | n.d. | 2513. | n.d. | n.d. | n.d. | 2419 | 2325 | 2449 | n.d. | n.d. | n.d. | n.m. |
| Open time at RT [min] | 80 | 104 | 3 | 25 | 88 | 166 | 124 | 113 | 2050 | 21 | 616 | 31 | 585 | 383 | >2500* |
| Open time at 120° C. [s] | 44 | 37 | 12/ | 38 | 37 | 40 | 31 | 36 | 45 | 98 | 186 | 31 | 37 | 56 | >90.* |
| Demoulding time at 120° C. [s] | 83 | 84 | 46 | 76 | 79 | 99 | 82 | 84 | 110 | 180 | 240 | 78 | 85 | 94 | n.m. |
| Difference between OZ at RT and 120° C. [s] | 4756 | 6203 | 158 | 1462 | 5201 | 9861 | 7409 | 6744 | 122893 | 1162 | 36774 | 1829 | 35063 | 22924 | n.d. |
| Open time at 120° C. [s] after 2 weeks' storage at RT | 37/81 | 42/90 | 19/59 | 36/76 | 44/97 | 43/110 | 32/84 | 33/83 | 46/120 | n.d. | Same A-comp. as Ex. 1 | 30/77 | Same A-comp. as Ex. 1 | Same A-comp. as Ex. 1 | Same A-comp. as Ex. 1 |
| Storage-stable formulation Yes/No | Yes | Yes | No, no constant OZ | Yes | No, inhomogeneous A | No, inhomogeneous A | No, inhomogeneous A | No, inhomogeneous A | Yes | No | Yes | Yes | Yes | Yes | n.m. |

Key:
n.d.: not determined
n.m.: not measurable
*no defined transition from liquid to solid The storage stability was determined by two weeks of storage at room temperature and assessed on the basis of the OH number and also the homogeneity of the sample.

Table 1 shows that only when using polyols having primary OH groups are polyurethane-polyisocyanurates obtained that have outstanding mechanical properties and high glass transition temperatures, when the alkalinity of the polyols used is low. The alkalinity here was determined in accordance with ASTM D6437 EN. Polyols having predominantly secondary OH groups lead to brittle products which have not undergone full reaction and which, in view of their brittleness, break up even during sample preparation, or have a glass transition temperature which in combination with the mechanical values is not advantageous.

Without addition of catalyst, the reaction mixture does not cure properly (Comparative 10). With a conventional catalyst (Comparative 8), curing is indeed obtained, but the resulting polyurethane-polyisocyanurates have fairly moderate mechanical properties and a relatively low glass transition temperature. Without any catalysis (Comparative 10), curing is not achieved.

With the ZM2 described in WO10121898 (Comparative 9), consisting of LiCl and urea prepolymer, obtainable by reaction of Jeffamin M600 and Iso 3 and also 0.50 eq. of LiCl, based on the number of urea bonds in the prepolymer, as described correspondingly in WO10121898, polyurethane-polyisocyanurates having good mechanical properties and high glass transition temperatures are indeed likewise obtained. However, relative to Example 1, which was obtained from the identical starting substances apart from the additive, the properties thereof are significantly poorer, particularly for tensile strength and heat deflection temperature. The glass transition temperatures found are also substantially lower than for example 1. Moreover, the open times and demoulding times for the same amount of ZM are much slower, resulting in a distinct prolongation of the demoulding time and being therefore less preferable for the application.

The invention claimed is:

1. A process for preparing polyurethane-polyisocyanurate compounds by mixing
    component (a) polyisocyanate with
    component (b) mixture comprising an alkali metal or alkaline earth metal salt and a compound R—NH—CO—R' containing exclusively monodentate urethane groups in relation to the salt anion or cation used, wherein R and R' are, independently from one another, an organic radical;
    component (c) compounds containing one or more epoxide groups, and
    component (d) one or more compounds having at least two isocyanate-reactive groups, comprising compounds having $NH_2$ and/or primary OH groups,
    to form a reaction mixture, and reacting said reaction mixture to form a polyurethane-polyisocyanurate compound, wherein a molar amount of alkali metal and/or alkaline earth metal ions in the reaction mixture per mole of urethane group in component (b) is 0.0001 to 3.5 and the reaction mixture has an isocyanate index greater than 150.

2. The process according to claim 1, wherein the fraction of —$NH_2$ groups and primary —OH groups overall in the sum total of all —$NH_2$ groups and —OH groups in component (d), is at least 50%.

3. The process according to claim 1, wherein component (d) comprises polyether polyol having at least 50% of primary OH groups.

4. The process according to claim 1, wherein a fraction of polyester having at least 50% of primary —OH groups in component (d) is less than 50 wt %.

5. The process according to claim 1, wherein component (c) and component (d) are mixed to form a polyol component before being mixed with component (a).

6. The process according to claim 5, wherein component (a) and component (b) are mixed to form an isocyanate component before being mixed with the polyol component.

7. The process according to claim 1, wherein a first polyisocyanate is used as component (a), and the compound containing urethane groups in component (b) is a reaction product of a second polyisocyanate and a compound having at least one OH group, the first and second polyisocyanates being identical or different from one another.

8. The process according to claim 7, wherein the second isocyanate comprises one or more isomers or homologues of diphenylmethane diisocyanate or prepolymers of diphenylmethane diisocyanate.

9. The process according to claim 7, wherein the first polyisocyanate and the second polyisocyanate are identical.

10. The process according to claim 1, wherein component (c) contains two or more epoxide groups per molecule.

11. The process according to claim 1, wherein component (b) is obtained by mixing polyisocyanate, a compound having an isocyanate-reactive group, and the alkali metal or alkaline earth metal salt.

12. The process according to claim 1, wherein the alkali metal or alkaline earth metal salt is lithium chloride.

13. The process according to claim 1, wherein component (c) is used in an amount such that an equivalents ratio of epoxide groups in component (c) to isocyanate group in component (a) and also any isocyanate groups contained in component (b) is 0.05 to 1.0.

14. The process according to claim 1, further comprising mixing components (a), (b), (c), and (d) with component (e) fillers and other additives to form the reaction mixture.

15. The process of claim 1, wherein R and R' are, independently from one another, substituted or unsubstituted hydrocarbyl radicals having 1 to 50 carbon atoms.

* * * * *